United States Patent [19]

Herth et al.

[11] E Re. 31,174

[45] Reissued Mar. 15, 1983

[54] FUEL INJECTION SYSTEM

[75] Inventors: Harro Herth, Schwieberdingen; Bernd Kraus, Stuttgart; Wilfried Sautter, Ditzingen; Wolf Wessel, Oberriexingen, all of Fed. Rep. of Germany

[73] Assignee: Robert Bosch GmbH, Stuttgart, Fed. Rep. of Germany

[21] Appl. No.: 75,066

[22] Filed: Sep. 12, 1979

Related U.S. Patent Documents

Reissue of:

[64] Patent No.: 4,073,269
Issued: Feb. 14, 1978
Appl. No.: 605,852
Filed: Aug. 19, 1975

[51] Int. Cl.[3] ..... F02D 3/00

[52] U.S. Cl. ..... 123/489; 60/285

[58] Field of Search ..... 123/32 EE, 32 EA, 119 EC; 60/276, 285

[56] References Cited

U.S. PATENT DOCUMENTS

| | | | |
|---|---|---|---|
| 2,389,797 | 11/1945 | MacNeil et al. | 60/276 |
| 3,690,305 | 9/1972 | Shimada et al. | 123/119 EC |
| 3,827,237 | 8/1974 | Linder et al. | 123/119 EC |
| 3,875,907 | 4/1975 | Wessel et al. | 123/32 EE |
| 3,919,983 | 11/1975 | Wahl et al. | 123/32 EE |
| 4,099,491 | 7/1978 | Reddy | 123/32 EE |
| 4,112,880 | 9/1978 | Asano et al. | 123/32 EA |

*Primary Examiner*—Parshotam S. Lall
*Attorney, Agent, or Firm*—Edwin E. Greigg

[57] ABSTRACT

A fuel injection system for an internal combustion engine includes electromagnetic injection valves controlled by a fuel control unit which receives signals from a camshaft actuated switch, a position-dependent throttle transducer and an oxygen sensor. When the oxygen sensor changes output levels, the transmission of this information is delayed, by the action of a switching transistor controlled by a monostable multivibrator, for a period of time equal to the internal time constant of the multivibrator.

2 Claims, 5 Drawing Figures

FUEL INJECTION SYSTEM

Matter enclosed in heavy brackets [ ] appears in the original patent but forms no part of this reissue specification; matter printed in italics indicates the additions made by reissue.

BACKGROUND OF THE INVENTION

The invention relates to a fuel injection system with an integral controller for changing the fuel-air mixture supplied to the internal combustion engine under the control of an oxygen sensor located in the exhaust gas path of the internal combustion engine (lambda control).

It is known to change the mass ratio of components in the fuel-air mixture supplied to an internal combustion engine in dependence on exhaust gas composition, with the aid of an oxygen sensor located in the exhaust gas stream of the internal combustion engine. The known system usually includes a controller which produces an appropriate increase or decrease of the instanteous fuel quantity added to the combustion air stream and it does so in dependence on the output signal of the oxygen sensor. It is known that this type of adjustment of the mass ratio of the fuel-air mixture may be employed in internal combustion engines using carburetors as well as in those using fuel injection systems. The controllers which change the mass ratio of the fuel-air mixture normally and preferably have integral control behavior so that, when the effective value deviates for an extended period of time, the effort applied to correct the mass ratio increases continually. In a known fuel injection system of this type, the only control effort is that which aims at an air number of $\lambda=1.0$. Due to the fact that the characteristic output voltage of the oxygen sensor changes with finite slope, it is possible to obtain a very small change in the air number by varying the triggering level of the subsequent threshold switch, but this permits a change of the air number only in the direction of a richer fuel-air mixture and does not provide the desired range or variation which should be approximately $\pm 5\%$ about the value $\lambda=1.0$ so that the internal combustion engine might be operated in an arbitrarily selectable region which lies between $\lambda=0.95$ up to $\lambda=1.05$ while retaining all the advantages of so-called $\lambda$-control.

OBJECT AND SUMMARY OF THE INVENTION

It is a principal object of the invention to provide a fuel injection system of the known and above described type which is capable of regulating the fuel-air mixture supplied to the internal combustion engine in a region in which the air number $\lambda$ varies between approximately 0.95 up to approximately 1.05, in dependence on the composition of the exhaust gas of the engine.

This object is attained, according to the invention, by providing a control system which includes a comparator circuit that receives the control voltage from the oxygen sensor. The output of the comparator is connected to the input of an integrating circuit and to an electronic switch that includes a monostable multivibrator. After the occurrence of a voltage jump at the output of the oxygen sensor, the change over of the direction of integration of the integrator is delayed for an adjustable period of time, equal to the time constant of the monostable multivibrator. The integrator is coupled to an electronic fuel controller system which, in turn, actuates the final control element which changes the fuel-air mixture composition.

The invention provides that, when the output voltage of the comparator changes to the positive level, the input to the integrator may be short-circuited during the time the monostable multivibrator resides in its unstable state.

The invention further provides that the inputs of the integrator may be held at a high potential by means of a transistor whenever the voltage at the output of the comparator changes to the negative level.

Another feature of the invention is that the time constant of the monostable multivibrator can be changed in dependence on the aspirated air quantity and/or the rpm.

Another embodiment of the invention provides that when the output voltage from the comparator changes in either sense, the inputs of the integrator may be disconnected during a period equal to the time constant of the monostable multivibrator.

Thus, the invention provides an apparatus including electronic circuitry which permits a fuel injection system to operate the internal combustion engine with a fuel mixture which can be made either richer or leaner than a stoichiometric mixture.

The invention will be better understood as well as further objects and advantages will become more apparent from the ensuing detailed specification taken in conjunction with the drawings.

DESCRIPTION OF THE PREFERRED EMBODIMENTS

Figure 1:
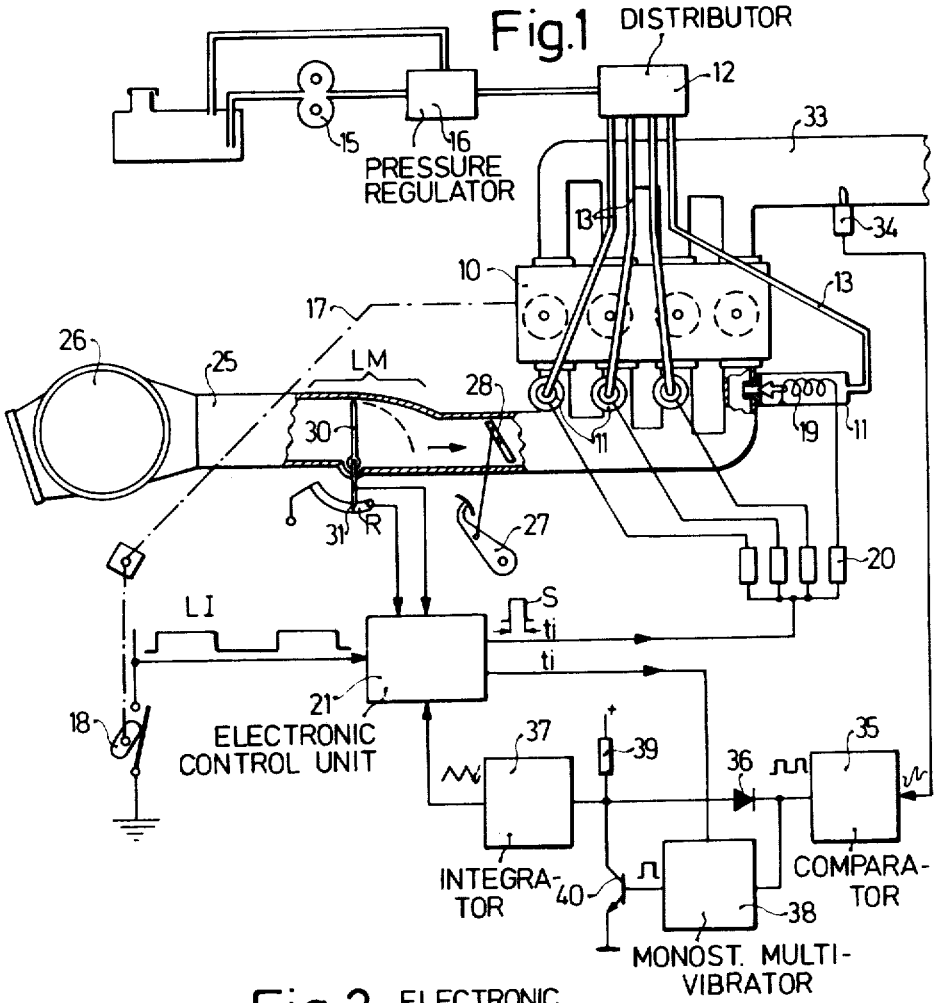
FIG. 1 is an overall diagram of an internal combustion engine and an associated fuel injection system according to the invention, including a block diagram of the electronic fuel control circuit.

The fuel injection system depicted in FIG. 1 is intended to service a four-cylinder four-cycle internal combustion engine 10. This fuel injection system includes, as essential constituents, four electromagnetically actuatable fuel injection valves 11, which are supplied with fuel from a distributor 12 through individual fuel lines 13. The system further includes an electronically driven fuel supply pump 15, a pressure regulator 16 which controls the fuel pressure to a predetermined constant value, and it also includes an electric control and regulating mechanism which will be described in detail below. This mechanism is triggered twice during each camshaft revolution by means of a signal generator 18 operatively coupled to the camshaft 17 and thus delivers a rectangular electrical pulse S which is used to control the injection valves 11. The pulse width $t_i$ shown in the drawing determines the opening time of the injection valves and thus also determines the quantity of fuel which is delivered by the injection valves during their opening time, due to an internal constant pressure of approximately 2 bar. Each of the magnetic windings 19 of the injection valves is connected to an individual decoupling resistor 20. All the resistors 20, are in turn, connected to a common amplifying and power stage belonging to an electronic control unit 21 which includes at least one power transistor whose emitter-collector path is connected in series with the decoupling resistors 20 and, hence, with the magnetic windings 19, whose other end is grounded.

In the operation of mixture-compressing and externally ignited internal combustion engines of this type, the fuel quantity provided to a particular cylinder during each piston suction stroke is so chosen that it may be completely combusted during the subsequent power stroke. High engine efficiency requires that no substantial amounts of unused air remain in the cylinder after the power stroke. To provide the desired stoichiometric ratio of aspirated air and fuel, the induction tube 25 of the internal combustion engine includes an air flow rate meter LM, located downstream of a filter 26 but upstream of a throttle butterfly valve 28 which may be adjusted by a gas pedal 27. The flow rate meter 11 consists substantially of a baffle plate 30 and a variable potentiometer R whose adjustable tap 31 is moved by the baffle plate. The electrical output of the air flow rate meter LM is fed to the electronic control unit 21 whose own output supplies the injection pulses of width $t_i$.

The electronic control unit 21 includes two transistors in push-pull operation and connected in mutual feedback configuration and it also includes an energy storage device which may be a capacitor or an inductor. The duration of the discharging process of the energy storage device determines the opening duration $t_i$ for the injection valves. Prior to each discharging process, the energy storage must be charged in an appropriate manner.

The charging process of the energy storage device is accomplished by a switch, embodied in this example by a signal generator 18 which is actuated in synchronism with the crankshaft rotation, which provides that the energy storage device is connected to a source of electric charge during a predetermined, constant angular motion of the crankshaft. The switch 18 thus provides a charging pulse LI which makes available a charging current during this time. At the same time, the fuel controller 21 receives information regarding the air quantity admitted through the induction tube of the engine during this interval. In the present case, let it be assumed that the signal generator 18, which may also be embodied in a practical situation by a bi-stable multivibrator clocked by ignition pulses, is closed over a crankshaft angle of 180° and is then opened over the remaining angle of 180°.

In that case, it is possible to achieve as nearly exact a regulation of the air number λ as desired by providing an oxygen sensor 34 in the exhaust pipe 33 of the internal combustion engine 10. This sensor 34 delivers a control voltage in dependence on the exhaust gas composition and this voltage is fed to the input of the comparator 35 whose output is connected through a diode 36 to the input of an integrator 37 and is also connected to the input of a monostable multivibrator 38. The anode of the diode 36 is connected through a resistor 39 to the positive voltage supply line and its cathode is connected to the output of the comparator 35. The output of the monostable multivibrator 38 is connected to the base of a transistor 40, whose emitter is grounded and whose collector is connected to the input of the integrator 37. The output voltage of the integrator is fed to the electronic fuel controller 21 which forms the injection pulses $t_i$.

It is a principal object of this invention to provide an apparatus that can operate the engine at an air number λ which is different from unity (1) while using an oxygen sensor which changes voltage exactly at $\lambda=1$. For this purpose, it is provided that the reversal of the direction of the change of the output voltage from the integrator 37, which would normally begin when the output voltage from the oxygen sensor switches abruptly, is delayed for a predetermined time $t_v$. The circuit shown in FIG. 1 makes possible a control of the fuel-air mixture so that the air number λ is greater than 1. This purpose is achieved by providing that, when the output of the comparator 35 switches to a positive value, the monostable multivibrator 38 is triggered and its output renders the transistor 40 conducting for a time $t_v$, corresponding to the time constant of the monostable multivibrator 38, and thus holds the input of the integrator 37 at zero potential. During this time $t_v$, the integrator 37 continues to exert control in the direction of a leaner mixture even though the oxygen sensor 34 has already signalled that a richer mixture is required.

Figure 2:
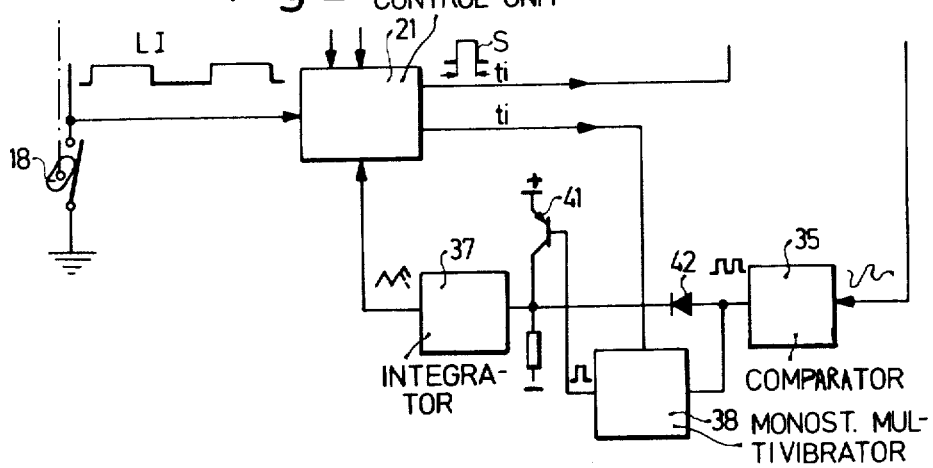
FIG. 2 is a block diagram of a fuel control circuit similar to that shown in FIG. 1, but for the condition $\lambda$ 1.0.
Figure 5:
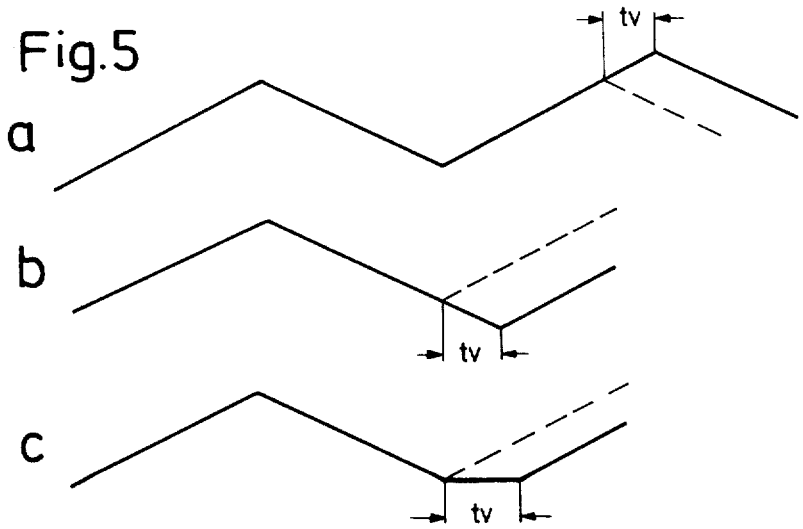
FIG. 5 is a diagram showing the output voltage of the comparator circuit as a function of time in the different embodiments of the invention.

FIG. 2 is an electronic control circuit which is very similar to that shown in FIG. 1 but which permits control of the air number λ to values where λ is less than 1 (rich mixture). For this purpose, the diode 42 is reversed from the position in FIG. 1, so that its anode is now connected to the output of the comparator 35, while the output of the monostable multivibrator 38 is connected to the base of a transistor 41 whose emitter is connected to the positive supply line and whose collector is coupled to the input of the integrator 37. Engine control with a richer mixture than a stoichiometric mixture is achieved by holding the input of the integrator 37 at a high potential for a predetermined time $t_v$ after the output voltage from the comparator 35 shifts in the negative direction. Thus the integrator continues to provide a control signal for a richer mixture even though the oxygen sensor 34 has already signalled that a leaner mixture is required. FIG. 5a is a diagram showing the output voltage from the integrator 37 as a function of time during a control process wherein λ is less than 1.

FIG. 5b is a diagram of the integrator voltage as a function of time when λ is greater than 1.

Figure 3:
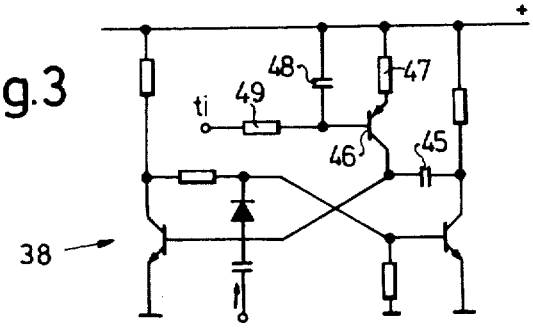
FIG. 3 is a circuit diagram showing the internal detail of the circuit associated with the monostable multivibrator in FIGS. 1 and 2.

Since the dead time and the general response characteristics of the controller are strongly dependent on the air throughput of the internal combustion engine, it is useful to be able to change the delay time $t_v$ as a function of the air throughput and/or the rpm of the engine. FIG. 3 is a circuit associated with a monostable multivibrator 38 which permits a throughput-dependent control process. A current source, formed by a transistor 46 and a series resistor 47 varies the current used for charging the timing capacitor 45. An RC member, formed by a resistor 49 and a capacitor 48 is used to generate a throughput dependent DC potential from the injection pulse $t_i$, which is fed to the base of transistor 46 and controls the current I in the desired manner.

Figure 4:
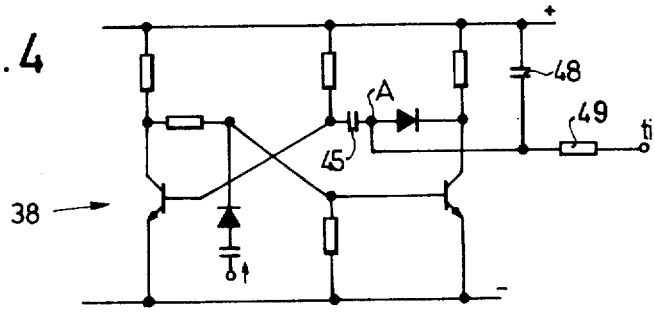
FIG. 4 is a circuit diagram of a second embodiment of the circuit associated with the monostable multivibrator in FIGS. 1 and 2.

FIG. 4 shows a monostable multivibrator 38 whose time constant $t_v$ is changed by applying a voltage at point A; this voltage is also derived from the injection pulses $t_i$, in the manner shown in FIG. 3.

Yet another possibility to delay the reversal of the direction of integration of the integrator 37, consists in holding the output voltage from the integrator constant for a predetermined period of time $t_v$ when a voltage shift occurs at the output of the comparator 35. This may be done by disconnecting the integrator input, for example through a switching transistor controlled by the multivibrator 38. The time behavior of the integrator output voltage for this case is shown in FIG. 5c.

Construction of electronic control unit 21 is known, for example, for U.S. Pat. No. 3,750,631.

What is claimed is:

[1. A fuel-air control system for an internal combustion engine, including a controller with integral control characteristic for controlling the fuel-air mixture admitted to the engine (λ-control process) and including (A) an oxygen sensor, located in the exhaust system of the engine, and capable of providing an output signal; the improvement in said fuel-air system comprising:

(B) a comparator circuit, for comparing said output signal from said oxygen sensor with a reference value and providing an output signal;

(C) an integrating circuit, whose sole control signal input is connected to the output from said comparator circuit and which delivers a changeable output signal;

(D) a flip-flop circuit, including an adjustable monostable multivibrator whose control input is connected to the output from said comparator circuit according to which output the multivibrator is set and which delivers an output signal that in addition to the output of the comparator circuit is continuously connected to the input of said integrating circuit the output signal from said flip-flop circuit inhibits the transmission of one of said output signal from said comparator to said integrating circuit for delaying the change of its output signal in one direction for a period of time corresponding to the time constant of the monostable multivibrator, thereby delaying in one direction the response of said integrating circuit to changes in the output signal from said oxygen sensor;

(E) a control unit, connected to the output from said integrating circuit, for providing injection valve control signals; and (F) an air-fuel rate adjusting device connected to said control unit.]

[2. A fuel-air control system according to claim 1, the improvement further comprising:

(G) a transistor, controlled by the output from said flip-flop circuit and connected to the input of said integrating circuit to define the electric potential at said input; whereby said electric potential may be held at ground level during the unstable state of said multivibrator when said output signal from said oxygen sensor makes a transition to a more positive voltage.]

[3. A fuel-air control system according to claim 1, the improvement further comprising:

(G) a transistor, controlled by the output from said flip-flop circuit and connected to the input of said integrating circuit to define the electric potential at said input; whereby said electric potential may be held at high potential during the unstable state of said multivibrator when said output signal from said oxygen sensor makes a transition to a more negative voltage.]

[4. A fuel-air control system according to claim 1, further comprising:

(H) an air flow-rate meter, capable of providing an output signal which is connected to said flip-flop circuit to determine the duration of the unstable state of said multivibrator.]

[5. A fuel-air control system according to claim 1, further comprising:

(I) signal generator means, connected to said engine for delivering an r.p.m.-dependent output signal which is connected to said flip-flop circuit to determine the duration of the unstable state of said multivibrator.]

[6. A fuel-air control system according to claim 1, further comprising:

(J) switch means, connected between said flip-flop circuit and said integrating circuit; whereby the input of said integrating circuit may be electrically disconnected from said comparator circuit and from said flip-flop circuit.]

*7. A fuel-air control system for an internal combustion engine, including a controller with integral control characteristic for controlling the fuel-air mixture admitted to the engine (λ-control process) and including*

*(A) an oxygen sensor, located in the exhaust system of the engine, and capable of providing an output signal; the improvement in said fuel-air system comprising:*

*(B) a comparator circuit, for comparing said output signal from said oxygen sensor with a reference value and providing an output signal;*

*(C) an integrating circuit, whose sole control signal input is connected to the output from said comparator circuit and which delivers a changeable output signal;*

*(D) a timing circuit connected to the output from said comparator circuit and which delivers an output signal that in addition to the output of the comparator circuit is continuously connected to the input of said integrating circuit, the output signal from said timing circuit inhibits the transmission of said output signal from said comparator to said integrating circuit for delaying the change of its output signal in one direction for a predetermined period of time thereby delaying in one direction the response of said integrating circuit to changes in the output signal from said oxygen sensor;*

*(E) a control unit, connected to the output from said integrating circuit, for providing injection valve control signals;*

*(F) an air-fuel rate adjusting device connected to said control unit; and*

*(G) an air flow-rate meter capable of providing an output signal which is connected to said timing circuit to determine the duration of said predetermined time period.*

*8. A fuel-air control system for an internal combustion engine, including a controller with integral control characteristic for controlling the fuel-air mixture admitted to the engine (λ-control process) and including*

*(A) an oxygen sensor, located in the exhaust system of the engine, and capable of providing an output signal; the improvement in said fuel-air system comprising:*

*(B) a comparator circuit, for comparing said output signal from said oxygen sensor with a reference value and providing an output signal;*

*(C) an integrating circuit, whose sole control signal input is connected to the output from said comparator circuit and which delivers a changeable output signal;*

*(D) a timing circuit connected to the output from said comparator circuit and which delivers an output signal that in addition to the output of the comparator circuit is continuously connected to the input of said integrating circuit, the output signal from said timing circuit inhibits the transmission of said output signal from said comparator to said integrating circuit for delaying the change of its output signal in one direction for a predetermined period of time thereby delaying in one direction the response of said integrating circuit to changes in the output signal from said oxygen sensor;*

*(E) a control unit, connected to the output from said integrating circuit, for providing injection valve control signals;*

*(F) an air-fuel rate adjusting device connected to said control unit; and*

*(G) signal generator means, connected to said engine for delivering an rpm-dependent output signal which is connected to said timing circuit to determine the duration of said predetermined period of time.*

* * * * *